(No Model.) 8 Sheets—Sheet 5.

J. Q. A. HOUGHTON.
LASTING MACHINE.

No. 385,557. Patented July 3, 1888.

Witnesses.
G. B. Thomas,
M. Turner.

John Q. A. Houghton
Inventor,
by Price & Steuart
Attorneys.

(No Model.) 8 Sheets—Sheet 6.

J. Q. A. HOUGHTON.
LASTING MACHINE.

No. 385,557. Patented July 3, 1888.

Witnesses.
G. B. Thomas
M. Turner

John Q. A. Houghton,
Inventor.
by Price & Stewart
Attorneys.

(No Model.) 8 Sheets—Sheet 8.
J. Q. A. HOUGHTON.
LASTING MACHINE.

No. 385,557. Patented July 3, 1888.

Witnesses.
G. B. Thomas.
M. Turner.

Inventor.
John Q. A. Houghton,
by Price & Steuart,
Attorneys.

UNITED STATES PATENT OFFICE.

JOHN Q. A. HOUGHTON, OF BALTIMORE, MARYLAND.

LASTING-MACHINE.

SPECIFICATION forming part of Letters Patent No. 385,557, dated July 3, 1888.

Application filed July 30, 1887. Serial No. 245,669. (No model.)

*To all whom it may concern:*

Be it known that I, JOHN Q. A. HOUGHTON, a citizen of the United States, and a resident of Baltimore, in the State of Maryland, have invented certain new and useful Improvements in Machines for Lasting Shoes, of which the following is a full and complete specification, reference being had to the accompanying drawings.

My invention relates to that class of machines which are used for the purpose of fitting and adjusting the upper of a shoe upon the last and securing it in a stretched condition, which is understood in the trade by the word "lasting."

The objects of my improvements are, first, to provide a successful method of lasting a shoe by machinery; second, to provide a method and means by which a shoe of any length and of any width may be lasted upon the same machine; third, to provide means for crimping the edge of an upper before it is wiped over the last; fourth, to provide means for regulating the height of a last in the machine, so that a last of any height can be adjusted to the machine; fifth, to provide means by which cement may be used to secure the edge of the upper to the inner sole instead of nails.

My invention also consists in providing certain new devices and combinations of devices and a series of movements imparted to these devices—separate, successive, synchronous, and simultaneous—to accomplish its results, and also in providing the apparatus with means for producing such movements.

In the drawings, 1 represents the base of the machine; 2, a rear standard secured to said base or made in one piece with it and provided with a lateral extension, 3, at the top, forming the standard for the heel-lasting devices of the machine.

Figure 2:
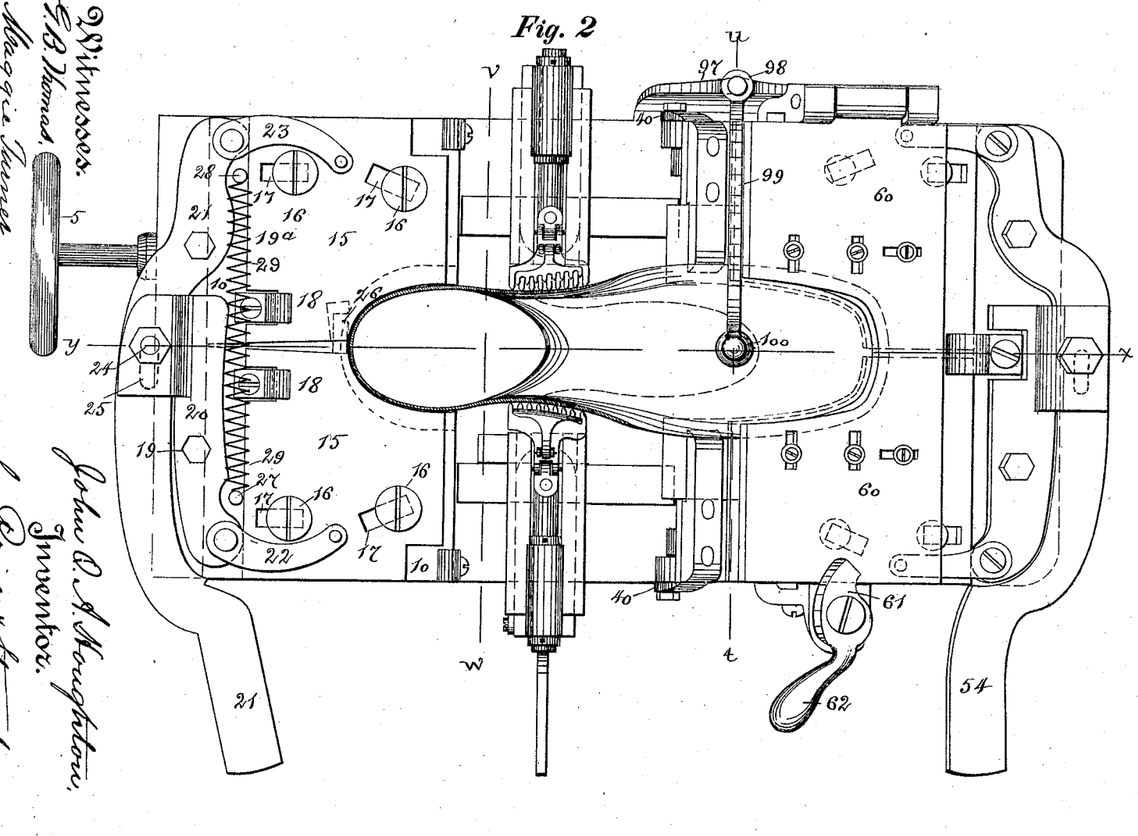
Fig. 2 is a plan of the same.

4 is a screw provided with a hand-wheel, 5. Said screw is provided with an annular groove, 6. The screw 4 passes freely through a collar, 6ª, set in the extension of the standard 2. Through this collar passes the set-screw 7 and enters the annular groove 6 upon the screw 4, so that the screw may turn without having any lateral motion. Upon said screw 4 is fitted a nut, 8, Fig. 3, which is secured to plate 9, which is a carriage sliding forward and backward upon the standard 3 and held in place by the guides *a a* on either side, which extend downward over the edge of the standard 3. Resting upon the upper side of this plate 9 is another plate, 10. (Shown in Fig. 3.) It will be observed that in this figure plate 10 is shown in face view, while the balance of the figure is shown in section, and Fig. 2 shows this plate in two pieces, cut through the center lengthwise of the machine. This plate is provided with a transverse offset, 11, on the under side, which fits into a transverse groove, 12, in plate 9, and also with offset 13, projecting from its rear end, which fits into an undercut transverse groove, 14, in the back shoulder of said plate 9, so that the plate 10 may reciprocate transversely of the machine upon plate 9, being guided by the offsets 11 and 13.

27 and 28 are pins, one of which is set in each of said sections of plate 10. Between these pins is strung a spiral or other spring, 29, by which they are held together, yielding, however, when pressed apart. On top of plate 10 is a wiper-plate, 15, which, by reference to Fig. 2, it will be seen, is also divided in the center into two pieces, which are held down upon plate 10, and yet allowed to slide back and forth upon it, by screws 16 16, inserted through slots 17 17 and screwed into plate 10. The plate 15 is also held down by projecting lugs 18 18, which project over said plate and are secured rigidly to the plate 10. The plate 15 thus secured to plate 10 will reciprocate with it, as it moves transversely of the standard-plate 9. The bolts 19 19 are inserted through the lever-arms 20 21 and screwed into the standard bed-plate 9. These bolts form fulcrums, upon which the levers 20 21 are pivoted. Lever 20, fulcrumed at 19, is provided at one end with a link, 22, which is secured by a stud to plate 15, and at the other is provided with a stud, 24, which enters a slot, 25, in lever 21. Lever 21, fulcrumed at $19^a$, is also provided with a similar link, 23, which is attached to a stud inserted in wiper-plate 15. The other end of lever 21 is extended and forms a handle by which the levers 20 and 21 and wiper-plate 15 are operated.

Figure 3:
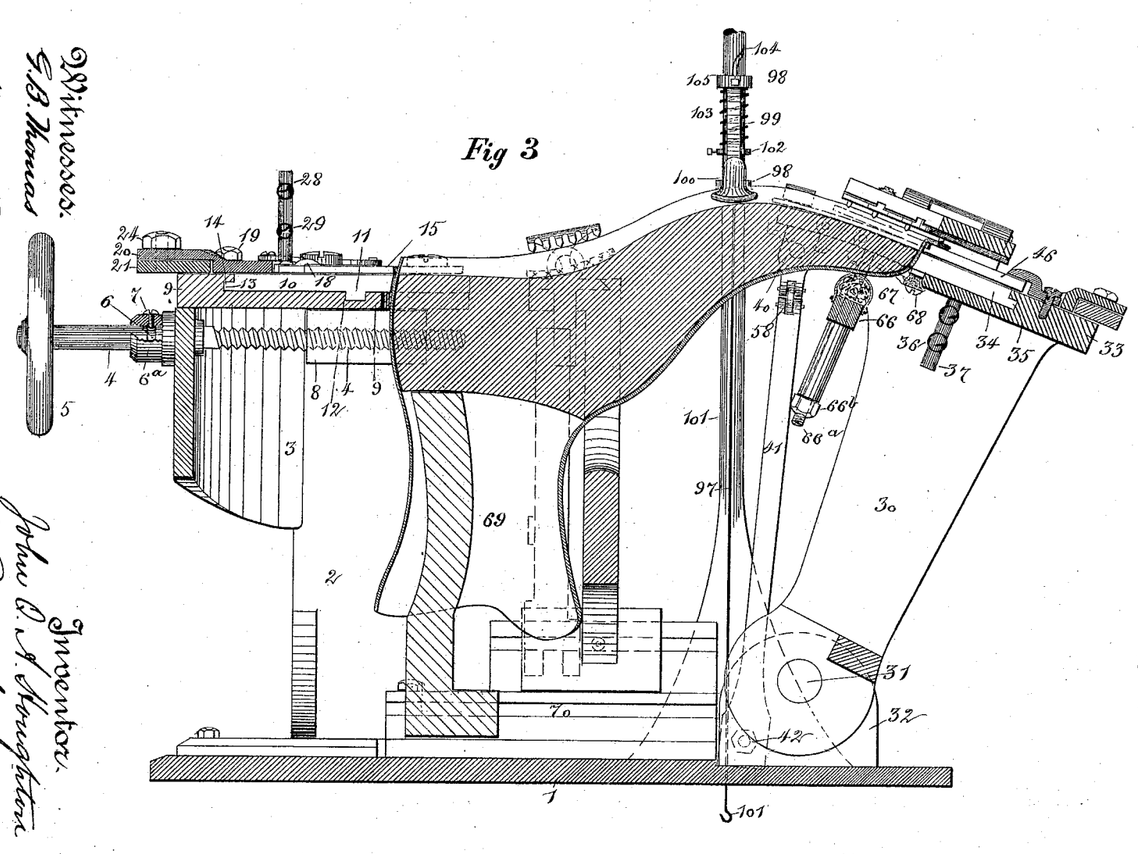
Fig. 3 is a sectional elevation of my machine, cut through the line *x y*, Fig. 2.

Viewing Figs. 2 and 3, it will be seen that the plates 10 and 15 are provided with a heel-shaped recess to admit the heel of a last, and that the opening between the sections of plate 10 is covered by tongue 26, which is attached to one section of said plate and enters a slot in the other immediately behind the heel. The two slots 17 17 in the front end of plates 15 15 are cut at an angle, with the center line of the machine inclining inwardly, while the two slots in the back of the plate are parallel to said center line. The result is that when the plate 15 is actuated by levers 20 and 21 its sections move in forward direction and in converging lines, the edge of its recess overlapping the heel of the last all around. It is obvious that the heel-lasting device, instead of being made to slide by the action of the hand-screw, as just described, may be mounted upon standards and made pivotal to the bed-plate.

Figure 1:
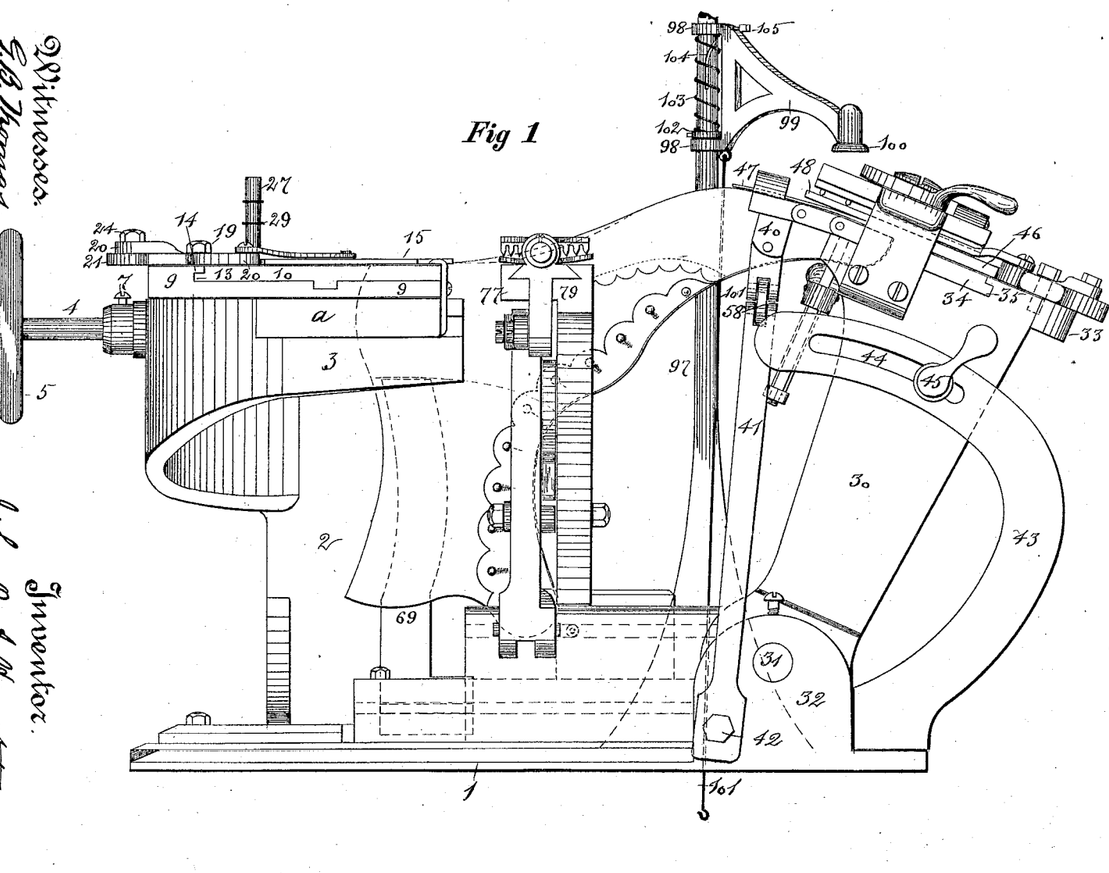
Figure 1 is a side elevation of my improved lasting-machine, not showing, however, the stand upon which it rests or the treadle or lever by which the last presser is worked.
Figure 5:
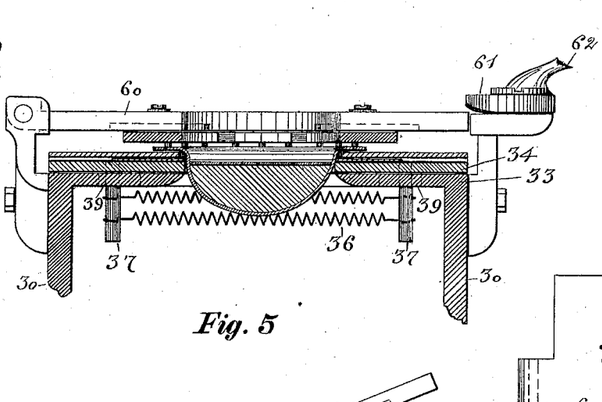
Fig. 5 is a section of toe-clamp and toe of last with clamp down, cut through line *t u*, Fig. 2, wipers extended and upper held between clamp and wipers.
Figure 6:
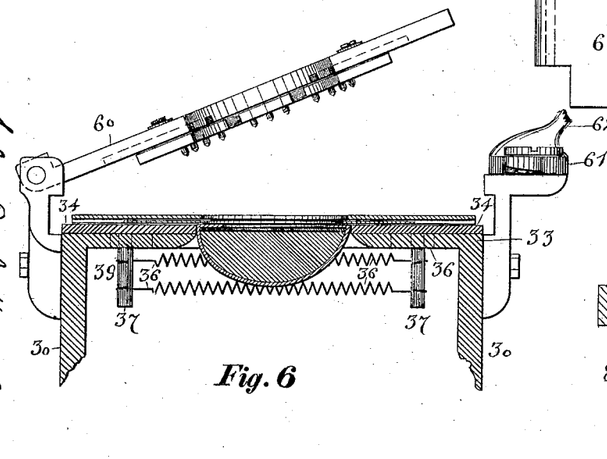
Fig. 6 is a section of toe-clamp and toe of last, cut through same line, with clamp up, upper released, and wiper brought forward over the last.
Figure 8:
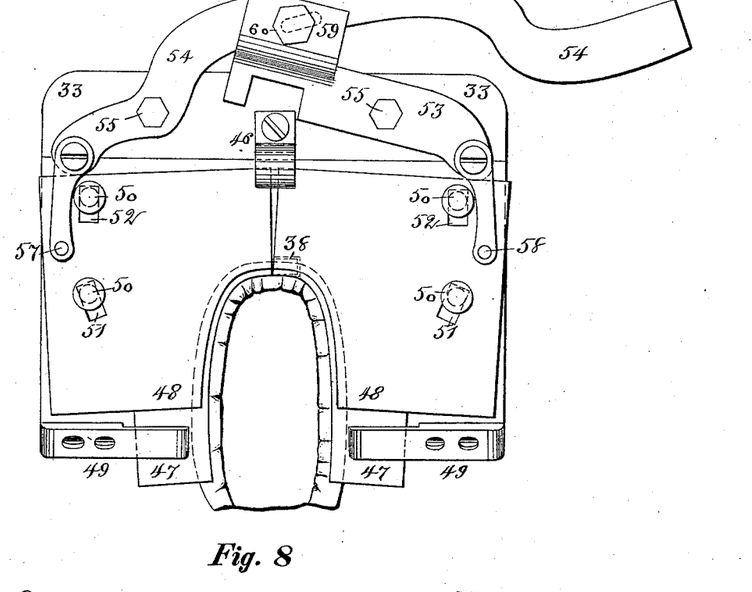
Fig. 8 is a plan of the toe-lasting device with the clamp removed and the wipers brought forward over the last, having carried the upper with them.
Figures 9, 11:
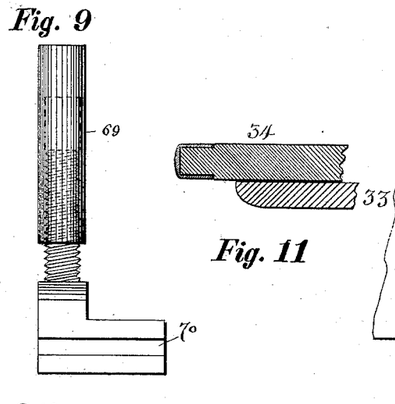
Fig. 9 is a side elevation of the last-jack, showing means for adjusting its height to suit any height of last.
Fig. 11 is a section of part of the plate shown in Fig. 10, cut through line *y y*.
Figure 10:
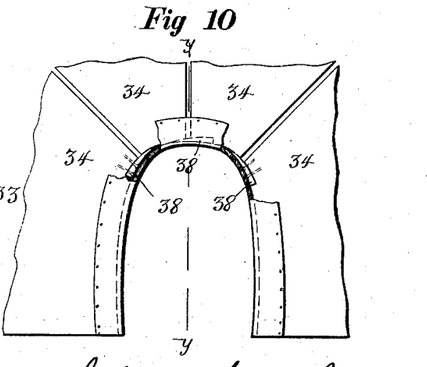
Fig. 10 is a plan of the toe-form plate, made in four pieces and having the edge covered with rubber or leather. This figure also shows a means for covering the openings between the sections of the plates.

Upon the opposite end of the bed is mounted the toe-lasting device, in which 30 is a standard pivoted at 31 to an offset, 32, on said bed. The standards 30 are two in number, one on either side of the machine, and are connected at the top by a plate, 33. The plate 33 is cut down to provide a seat for the form-plate 34. It is also provided with an undercut groove to receive the offset 35 of the plate 34 and guide said plate in its transverse movement. The form-plate 34 is made in sections, as shown in dotted lines in Fig. 2 and in full lines in Fig. 10. These sections may vary in number. In Fig. 2 two sections are shown, while in Fig. 10 four are shown. The sections are pressed together by a spring or springs, 36 36, (shown in Figs. 5 and 6,) which are attached to posts 37 37, one of which is screwed into each of the outside sections of the form-plate, thus holding the sections together. Figs. 2 and 10 show said plate with a recess of the shape of the toe of a shoe. Figs. 8 and 10 show tongues 38 38 secured to one of each two adjacent sections of said form-plate and extending across the opening between them, so as to close it. The toe-form plate, as shown in Figs. 10 and 11, may be bare or covered with leather or rubber in any suitable manner. This toe-form plate is made in several pieces hinged together, as shown in Figs. 1 and 3, so that the part which contains the recess and adjacent to the toe of the last may be vertically flexible to conform to the curvature of the sole of the last at and near the toe. The posts 37 37 above described, which are screwed into the under side of toe-form plate 34, pass through slots in the plate 33. These posts, held in the slots 39 39, will permit a transverse, but prevent a longitudinal, motion of the toe-form plate 34 upon plate 33. The sections of the toe-form plate at the end next the center of the machine are provided with downward projections 40 40, to which are attached rods or straps 41 41 by means of pins passing through said downward projections and the head of said rods. The other ends of said rods are pivoted to the base of the machine by the bolts 42 42. 43 is a curved bracket seated and screwed to the base of the machine, and extending upward and forward in said bracket is cut a slot, 44, which is an arc of a circle having the pivot 31 as a center. 45 is a bolt with a handle attached to it, which passes through said slot 44 and is secured into the standard 30, so that the said standard may be fixed at any degree of inclination limited by the length of the slot 44. It will be observed that the centers 42 and 31, not being coincident, and the standard 30 being secured to rear section of the form-plate 34 and the rod 41 to the front section of said form-plate, as the standard 30 is moved back and forth upon its pivot the curvature of the form-plate may be altered at will, thus permitting its adaptation to the curvature of any last. The rod 41 is provided with a link, 58, which yields when the sections of the plate to which it is attached at its upper end are opened or closed. Above said form-plate and resting upon it is a wiper-plate. (Shown in Fig. 8.) This wiper-plate is made in two pieces, 47 and 48, the lower one thin and flexible, the upper one thick and rigid. The two plates are secured to one another at or near their rear ends, and the thin one extends forward toward the center of the machine as far or farther than the end of the flexible form-plate. Secured to the ends of the form-plate are the fingers 49 49, one on either side, which extend over said flexible wiper-plate and control its position, so as to cause it to conform to the curvature of the form-plate. The flexible part 47 of the wiper-plate has a recess similar in shape to that of the form-plate and of the same size, while the space in the thicker plate, which is shorter and does not extend to the fingers 49, is somewhat larger than that in the flexible plate. This provision is made for a purpose which will be hereinafter explained. Both parts of this plate are divided, so as to form two sections, and are secured to the form-plate by bolts 50 50, which are inserted through slots 51 51 and 52 52. Said slots, like those in the heel-wiper plate, 52 52, are parallel to the center line of the machine, while 51 51 are inclined toward said line, so that when the plates are brought forward by their levers they will be given a motion which will advance the edge of wiper 47 upon the last in a direction that will be approximately perpendicular to the edge of the last all round. It will be seen that inasmuch as the wiper-plates are divided into sections and secured to the sections of the form-plate, as the form-plate separates so will the sections of the wipers, and vice versa. The levers 53 and 54 are fulcrumed at 55 and 56 and each provided with a link at its end, which is attached to the wipers by a stud at 57 58. Lever 54 is extended into a handle and provided with a slot, 59, in which works a bolt, 60, secured in the end of lever 53, so that motion to both levers is given by one handle. The back ends of the section of the wiper-plate are held in place by a finger, 46, which is secured to the standard-plate 33, and extend over the rear ends of said sections, permitting them to slide, but holding them firmly down.

Figure 7:
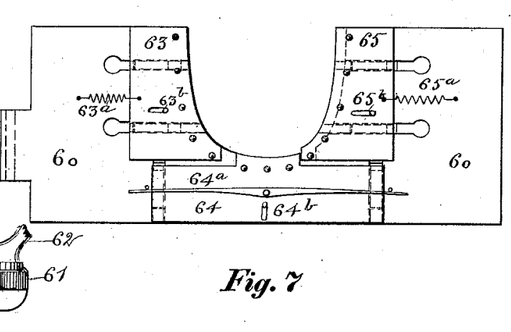
Fig. 7 is a plan of the under side of toe-clamp, showing plates for altering its size and springs for holding plates back against the pull of the upper.

Hinged to one side of the standard of the toe-lasting device is a clamp, 60, (shown in Figs. 2, 5, 6, and 7,) and which lies transversely of the machine, and like the form and wiper plates is provided with a recess which corresponds in form to the toe of the last. On the opposite side of the standard-plate is a cam-finger, 61, provided with handle 62, by which it is operated. This cam-finger, when turned by its handle or lever, passes above and presses upon clamp 60, holding it firmly down upon the wiper-plates 46. The under side of this clamp-plate is shown in Fig. 7, from which it will be seen that it is provided with supplemental plates 63, 64, and 65, which surround its toe-shaped recess, and which are fitted into dovetail or undercut grooves in said plate, and provided with retractile springs 63ª, 64ª, and 65ª, which operate to hold these supplemental plates back to their extreme positions in the dovetail grooves unless drawn forward. The motion of the plates is limited by suitable stops, 63ᵇ, 64ᵇ, and 65ᵇ. The under surface of the supplemental plates is provided with a row of pins (shown in Fig. 7) just inside of the edge of the recess, which, when the clamp is shut down upon the edge of the leather forming the front of the upper, which is turned outwardly, will firmly hold said upper between said pins and the wiper-plate beneath it, and when pressure is applied to force the last into the form-plate the plates 63, 64, and 65 will yield and permit it to give to the limit of their motion. Owing to the fact that the clamp, wiper-plates, and form-plates are all provided with a recess which is of the shape of the front part of the last, it will be seen (and this is an important point in my invention) that whenever an upper, however scant, is clamped between the wiper-plates and clamp the last may be passed through the recess in both clamp and wiper-plates into the upper, and be forced with the upper into the form-plate, stretching it all round the front. It will be observed the position occupied by the row of pins in the under side of the clamp bearing upon the leather when first clamped will be a circle, or approximately such, of greater radius than when said pins are drawn forward to their extreme position. Therefore the length of the curve described by said pins when first applied to the leather will be greater than the length of the curve described by said row of pins when they have been drawn forward, and as the leather of the upper is flat when first clamped it will be crowded into a shorter line when the pins are brought forward, and this crowding will cause the leather to be crimped. The pins are a uniform distance apart, and move forward toward the center all round the semicircle; but, each pin still holding the leather firmly, the leather will be crowded into uniform crimps all round the toe. In the drawings accompanying this application I have shown a clamp of this kind at the toe only; but it will be readily seen that a similar clamp for the same purpose may be applied to the heel also.

Hung from the under side of the toe-form plate is a cross-rod, 66, the upper surface of which is provided with a cushion, 67, covered with leather, rubber, or other soft material, upon which the toe of the last rests when forced into the upper and which prevents its descending too low into the form. This cross-bar may be sustained by springs or other yielding device, as may be desired; or, as shown in Fig. 3, the shank 66ª, upon which it is mounted, may be provided with a screw and nut, 66ᵇ, so that it may be raised or lowered at will.

In Fig. 3 a cushion of rubber, 68, is shown attached to the front edge of the standard-plate 33, which projects about as far as the edge of the form-plate and acts as a cushion upon which the last will bear as it is forced down into the form-plate 34.

69 is the last-jack, upon which the top of the last rests when placed in the machine. This jack is mounted on a way, 70, in such a manner as to permit it to be moved lengthwise of the machine, so that as the heel-lasting device is moved forward the jack may also be moved, so as to maintain a proper relative position to said heel-lasting device.

Figure 14:
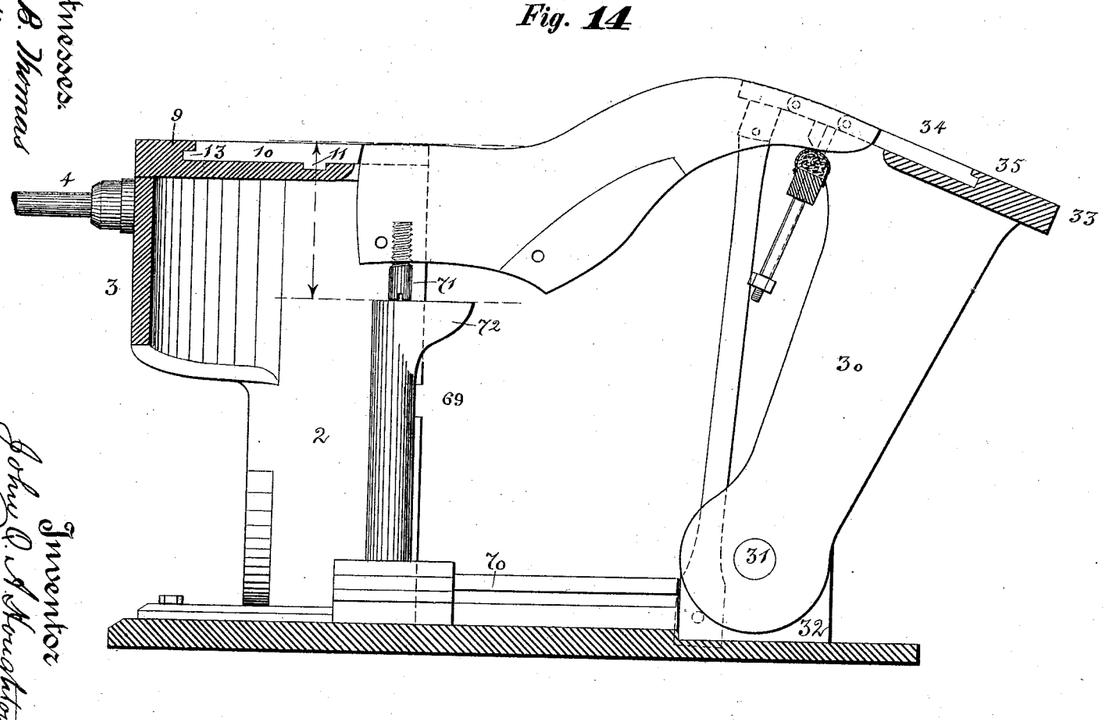
Fig. 14 is a skeleton sectional elevation of my machine, similar, but without the details, to Fig. 3, showing a stationary last-jack and means for regulating the position of the heel of the last in relation to the heel-lasting device.

In order that the heel-lasting device may perform its work promptly, it is necessary that the sole of the last at the heel should stand at a particular level in relation to it. To accomplish this result, I have shown in the drawings several devices. Fig. 3 shows a jack which cannot be varied in height and which can be used when lasts are all of the same height through the heel. The device shown in Fig. 9 is a jack mounted upon a screw and so arranged that it can be screwed up or down, so as to control the height of the bottom of the heel of the last. Fig. 14 shows still another device for accomplishing the same result, which consists of a jack which is not extensible and a screw, 71, set into the top of the last to such a depth that the bottom of the heel of the last will be at the required level. It will readily be understood that when lasts of varying heights are to be used in the same machine by adjusting this screw so that the distance indicated by the arrow-heads in Fig. 14 between the head of the screw and the bottom of the heel of the last will be equal to the distance from the top of the jack to the under side of the wiper-plate a proper level for all lasts may be attained without altering the height of the jack. Another method of accomplishing this same result is to bore a hole in the top of a number of lasts of varying heights, the bottom of which shall be always the same distance from the bottom of the heel of the last, and then driving into these holes pegs of the same length. Thus the distance from the top of the peg to the bottom of the last will always be equal, and a last of any size may be used in this machine without changing the height of the jack. The jack, Fig. 14, is shown with a forward extension, 72, which is provided for the purpose of allowing the machine to be used with a wide range of sizes of lasts without requiring any movement of the jack. If, however, it is desired, the jack and heel-lasting device may be so connected with one another and made to move simultaneously and by the same moving mechanism.

Figure 4:
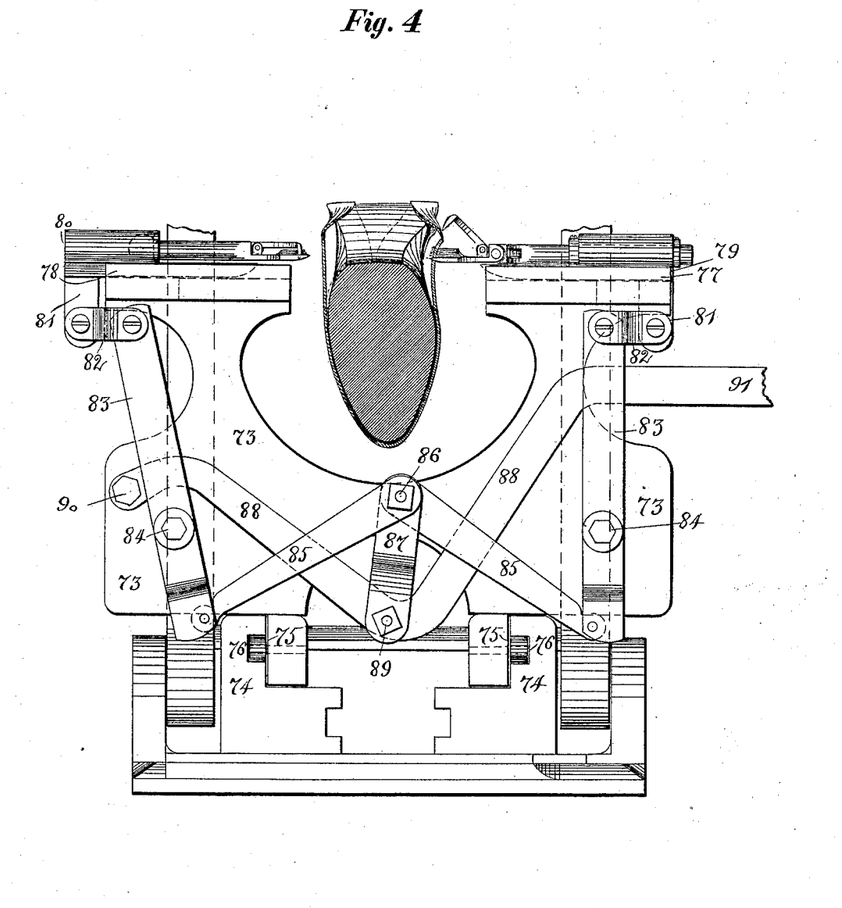
Fig. 4 is an elevation in cross-section through line *v w* on Fig. 2, showing shank-lasting device.

Fig. 4 shows the device used for lasting the shank of the shoe, and consists of a frame, 73, mounted upon the ways 74 74 and movable thereon longitudinally of the machine by means of rollers 75, which work in grooves 76 76 in said ways. This lasting device may be moved so as to adjust it to the last by hand or a lever, or it may be rigidly attached to the heel-lasting device and automatically adjusted with it. The sides 77 78 of said frame rise to the level of the heel-lasting device and are each provided with a transverse dovetailed or undercut groove, in which is fitted a sliding carriage, 79 and 80. To said carriage, on either side of the frame, is attached a fork. (Shown in various forms in Figs. 4, 12, and 13.) The rear end of said carriage is provided with downward projections 81 81, which are attached, by means of links 82 82, to the upper ends of levers 83 83. Said levers are fulcrumed at 84 84, and to their other ends are attached the toggle-links 85 85. Said links are joined together by a bolt at 86, to which point is also attached, upon the same bolt, a link, 87, which is attached at its other end to lever 88 at 89. Lever 88 is secured to the frame 73 by a bolt at 90, and provided at its other extremity with a handle, 91. It will be observed that the points 90, 84, and 84 are the only fixed points in the train. When the power is applied to the handle 91 of lever 88, the points 89 and 86 will be depressed and the toggle-links 85 85 thrust outside, and the motion of lever 88 divided between them if they both move equally, the levers 83 83 moved on their fulcrums, and the carriers 79 and 80 caused to approach one another. If one of the carriers be held fast and lever 83 on the same side with it, then the point 86 will not only be drawn down, but will be thrown in a direction away from the rigid lever, because the toggle-link on that side will cause it to move in an arc with said link as a radius. The outward thrust of said toggle-links, which had formerly been equally divided on both sides, will now be thrown entirely upon one side, and the lever 83 on that side will be caused to move through twice its former distance; hence the carrier with which said lever is connected will also move through twice its former distance. Thus if either carrier is held stationary all of the motion of the lever will be thrown upon the other, and the pressure will be equally divided between the two sides whatever the positions of the carriages may be. In right and left shoes the curve on one side is always greater than on the other, and hence the distance through which the upper has to travel will be greater on that side than on the other. With this device, when the slack leather on one side of the last has been fully stretched, the fork on that side will stop until the slack has been fully taken up on the other, no matter what the curve may be, and then the pressure on the lever will be equally divided between the two sides, so as to stretch both equally. Upon the carrier 79 and 80 are mounted forks which grasp the edge of the upper and are forced together by the levers to stretch it.

Figure 12:
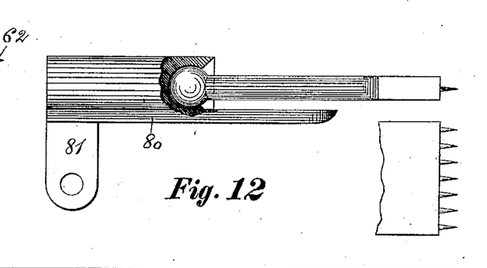
Fig. 12 is a side elevation of one form of fork for the shank device, having a part cut away, so as to show the ball-and-socket joint. There is also in this figure a plan view of a form of fork.
Figure 13:
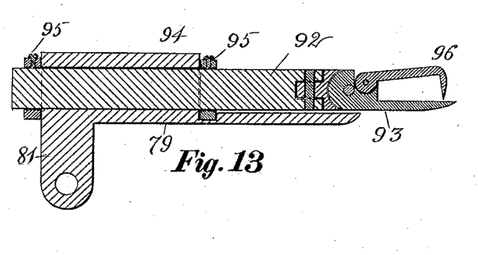
Fig. 13 is a section of another form of fork, and mounting for the same, for the shank-lasting device.

The shanks of uppers differ very much in length and shape, particularly in curved right and left shoes, thus making it necessary to provide for a great variety of motion in the forks, so as to stretch them tight and close to the last and take up all slack, wherever it may be. To accomplish this purpose, I have mounted the forks so as to follow the slack of the upper. Any form of fork or pinchers may be used. Figs. 12 and 13 show two forms, which are also shown in Fig. 4, and which have proven satisfactory. In Fig. 12 the end of the fork is provided with a ball, which rests in a socket mounted upon the carrier 80. The fork is made with a square edge with small fine pins set in its face, which penetrate the leather up to their heads so that a part of the strain of the pressure is borne by the face of the fork. It will be observed that with this fork the pressure applied to the carrier will be so distributed as to take up all the slack of the shank of the upper, the fork turning to either side, so as to form the resultant to the length of leather on either side of it. Then, too, in lasting an upper upon a last with a very steep instep, the fork has to be turned upon its axis so as to follow the inclination of the instep. This I accomplish by the same method of mounting. Fig. 13 shows another form of mounting the fork.

92 is the fork-stem, to the end of which is hinged a fork, 93. Said stem has a horizontal motion. Upon the carriage 79 is mounted a cylinder, 94, in which the fork-stem fits. The fork-stem is provided with adjustable collars 95 95, set upon it with set screws, one on each side of said cylinder, so as to prevent any horizontal motion in said fork or stem, but to allow it a rotary motion.

96 is a forked hook hinged to the main fork 93 and arranged so as to engage the edge of the upper when it is turned back over the fork and to hold it in place until the points of the fork have entered the leather and gotten a firm hold upon it. Any other equivalent device which will answer the same purpose may be used.

Figs. 1, 2, and 3 show the last presser or hold-down by which the last is forced into the upper, and consists of the standard or post 97, erected upon the bed of the machine, upon the top of which are fitted the collars 98 98 of an extending arm, 99, which is turned downward and provided on its end with a foot, 100. To the under side of this arm 99 is attached a rod or wire, 101, which extends down below the machine and is connected to a treadle. (Not shown in the drawings.) Upon said post, between the collars 98 98, is another collar, 102, which is rigidly fixed to said post by a set-screw. Above this rigid collar, and resting upon it and encircling the post, is a spiral spring, 103. Upon this spring rests the upper collar of the arm 99, so that when the arm is drawn down by the wire 101 it compresses the spring, and as soon as the pressure is removed the recoil of the spring will raise the arm and relieve the pressure on the last. It is desirable that the pressure of the foot 100 be applied at or near the ball of the last, and that when the presser-foot is relieved the presser should be moved out of the way to permit further operation of the machine. To accomplish this result automatically, a slot, 104, is cut in the post, the bottom part of which is perpendicular and the balance curved in a spiral direction on the post. Through a hole drilled in one of the collars 98 98 is a set-screw, 105, the end of which enters the groove 104. The groove 104 is so placed upon the post 97 that the arm 99, guided by stud 105, which works in said groove, and the foot 100 on the end of said arm, when it rests upon the ball of the last, will be in the perpendicular part of the groove 104. When the pressure is relieved upon the treadle and the spring 103 causes the arm to rise, the spiral groove, with the stud in it, will cause the arm to turn out of the way of the other parts of the machine. It has been customary heretofore in lasting shoes to stretch the upper over the last and then nail it to the last or to an insole upon the last. This process is slow and has many objections.

My machine makes it possible for me to secure the upper to the insole by means of a cement, in consequence of the fact that I stretch the upper completely all round the last at the same time, and hold it in the stretched position with the edge of the upper laid over on the insole before the fastening of the upper to the insole begins. The cement is applied to the bottom of the insole or the under side of the edge of the upper, and then a clamp, substantially such as is illustrated in Figs. 15, 16, and 17, is applied to the last to clamp the upper to the insole while the cement is setting, and is made independent of the machine, so that when applied to the last the whole last and clamp may be removed from the machine and laid aside to dry while another shoe is placed in the machine.

In order to secure a complete setting of the upper to the last in shoes that are made with a lining, I stitch the leather and lining together near the outer edge before putting them into the machine, so that when cemented the lining holds the leather firmly.

Figure 15:
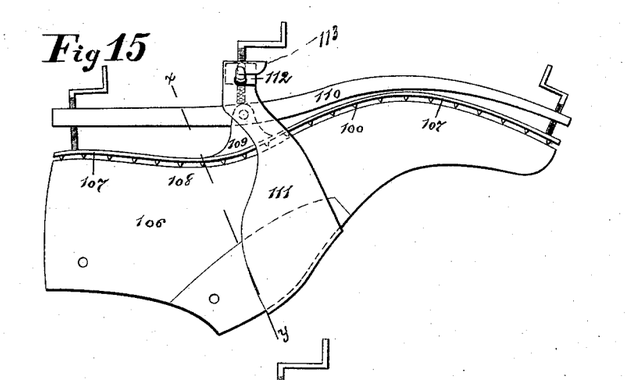
Fig. 15 is a side elevation of a clamping device used to clamp the upper to the last after the lasting has been completed.
Figure 16:
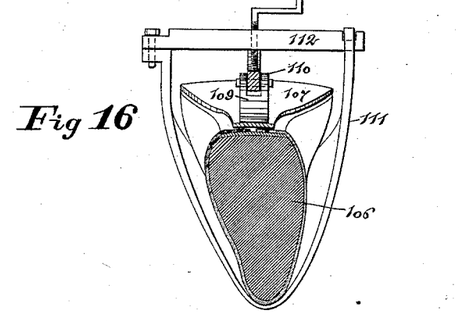
Fig. 16 is a vertical section of the same through line *x y*, Fig. 15.
Figure 17:
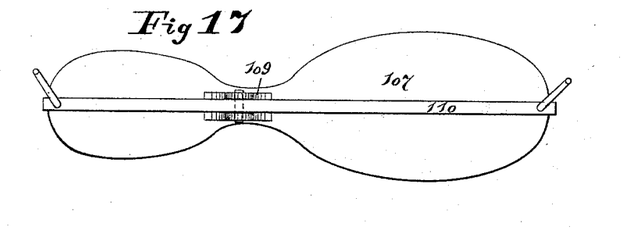
Fig. 17 is a plan of the sole of said clamp.

Viewing Figs. 15, 16, and 17, 106 is the last; 107, a flexible metallic sole provided on its under side with a row of pins, 108, all round its edge. In the center of said sole is a standard, 109, upon which is pivoted a yoke, 110, which extends the full length of the sole, and is provided at either end with a thumb-screw passing through it and bearing upon the ends of the sole. 111 is a strap, made preferably of iron or steel, and shaped so as to conform to the instep of the last. The ends of this strap rise on either side of the last above the level of the yoke 110, and are connected together at their top by another yoke, 112, through the center of which passes a thumb-screw, the lower end of which bears upon the yoke 110 immediately above its pivot and standard 109. It will be noticed that in Fig. 16 the yoke 112 is shown as secured to one side of the strap by a bolt, upon which it turns, while on the opposite side it has a projecting pin with a turned-up end which engages with a hook, 113, upon the free end of the strap, as shown in Fig. 15. Fig. 17 shows the sole of the clamping device cut on either side of the shank, so as to allow its pins at this point to strike the upper without striking the forks of the shank-lasting device.

The operation of the machine is as follows: A last is placed upside down in the machine, the plug or screw in its top resting upon the jack in position to bring the heel of the last to the required level. The screw 45 is then loosened by turning its handle, unlocking the toe-clamping device from the stationary arm 43. The toe of the last will stand in the recess cut out for it in the toe-clamp. The toe-lasting device is then moved forward or back, as may be necessary, so as to alter the curvature of the form-plate 34 and flexible wipers 47 and cause them to conform to the curvature of the sole of the toe of the last. When the proper curvature of the last is reached, the toe clamp is set by screwing up the clamping-screws 45. The heel-lasting device is then screwed up by the hand-wheel 5 until the heel of the last enters the recess in the standard, form, and wiper plates, and the form-plate 10 bears against the heel of the last. The shank-lasting device, if not connected to the heel-lasting device and operated by it, is adjusted upon its ways by hand or otherwise, so as to be suitably located to operate upon the shank of the shoe. It is a fact well known to shoe-makers that all sizes of last of a particular style or class are of the same curvature at the toe, or nearly so, so that the toe-lasting device once set will not require resetting while the same style of shoes are being made. The only adjustment, therefore, that will be necessary in lasting shoes of the same class, but of different lengths, will be the adjustment of heel and shank lasting devices, and if these are operated simultaneously but one adjustment will be required. Of course the machine once adjusted will not require any further adjustment for shoes of the same class and size. The machine adjusted to the last, the last is removed and the upper put into the machine, or the upper and last may be put into the machine together, so that when the machine is set for the last it will not again have to be removed. The edge of the upper forward of the instep is turned outward in a reverse direction from the position it will occupy when turned over the edge of the last upon the wiper-plate 46, and there clamped by the pins set in the under surface of the yielding plates 63, 64, and 65 all round the front of the upper from the ball of the last forward. The clamp 60 is locked by the cam-finger 61, and the upper is held fast. The treadle working the presser-foot or hold-down is then depressed and the presser-foot turned into position and brought to bear upon the ball of the last and pressed down upon it, forcing it into the upper and form-plate. Persons familiar with lasts for shoes will know that in many lasts which are rights and lefts a line which divides the toe centrally will not divide the heel centrally, so that when the toe of the last is forced into a form which is rigid the heel will be thrown to one side or the other, as the shoe is right or left. To accommodate this movement, it will be remembered that the form-plate and wipers of the heel-lasting device are mounted upon the standard-plate in such a manner as to permit a free sidewise motion of said plate and wipers, so that as the toe of the last is forced into the rigid form-plate this heel-lasting device can move with the heel of the last. The recess cut in the standard-plate 9, corresponding to that in the heel-form plate 10, is made larger than that in the form-plate, so as to allow for the shifting of the heel of the last from side to side. When the upper is clamped by the toe clamp, it is placed in such a position that it will bear the proper relation to the last when the upper is drawn, pulling with it the supplemental plates 63, 64, and 65 of the yielding clamp. Therefore, when the last is first put into the upper, the stud will stand upon the jack and the heel of the last in the heel-recess in the heel-lasting device down to the level at which the wipers are to be operated. The toe, therefore, is the part of the last only which is to be depressed. For this reason I am enabled to dispense with a heel-clamp, although one may, however, be used if desired. As pressure is exerted upon the treadle pressing the presser-foot down upon the ball of the last, the last will be forced farther into the upper, the heel of the last meanwhile resting against the heel-form plate, and by the pressure exerted upon the ball of the last pressed against said form-plate will clamp the heel of the upper tightly.

In lasting a shoe it is necessary that the strain exerted upon the upper shall be generally toward the toe—that is to say, the stretching of the upper should be applied to the toe of the upper and in lines running from the bottom of the instep to points on the edge of the front of the shoe. It is also necessary that the upper should be stretched close down upon the top of the toe of the last, so as to conform to its shape. To get this pressure in the right direction, I make clamp 60 long enough to hold the sides of the upper as far back as the heel of the last, so that as the last is forced into the upper the lines of stretching will radiate from about the bottom of the instep to points all round the front of the shoe as far back as the ball of the last. I accomplish this result in my machine by clamping the toe in the yielding clamp, and then adjusting the last in the upper with the heel down to the lowest level it has to occupy, and then forcing the toe of the last into the toe of the upper, which, being held by the toe-clamp, will throw the strain entirely upon the toe of the upper and in lines running from the instep to the pins of the toe-clamp. As the last is forced into the toe of the upper, the edge of the upper will be drawn out to the limit of the movement of the supplemental plates, and the leather drawn, as above described, with the supplemental plates, will be crowded all round the toe into a smaller space than it formerly occupied, thereby crimping it uniformly.

The toe-form plate, as above described, is divided into two parts longitudinally of the machine, which are joined together by springs 36 36, acting between posts 37 37. When the sections of the form-plate are drawn together, the recess in them is smaller than the last to be inserted into it, so that as the last is forced into this recess the sections will be expanded, the spring extended, and a pressure exerted upon the sides of the toe of the last by the sections of the form-plate. The effect of this pressure of the form-plate upon the last is to clamp the upper between the form-plate and the last, so that when the clamp is released, as is the case as soon as the last has been forced fully down into the form-plate, the upper will be firmly held in a stretched condition clamped between the last and the form-plate. As soon as the toe-clamp is released, the levers 54 and 21 are pushed out into the position shown for the toe in Fig. 8 and a similar position at the heel, forcing the flexible wiper-plates 47 47 of the toe and 15 15 of the heel over the last and the edge of the upper with them.

The shank-lasting device is best operated after the toe and heel have been completed. The forks are brought toward the shank by a depression of the lever 91, acting through the links and levers heretofore described. The teeth of the forks engage the edge of the upper, and as continued pressure is applied to the lever 91 the forks are caused to appoach one another. If one side of the upper is longer than the other, or one side of the last is more concave than the other, the fork on the short side will stop when its slack leather has been taken up, and the motion of the lever will be entirely communicated to the other fork until both sides have been equally stretched, when as much more pressure as may be necessary to fully stretch the leather may be applied. While the upper is thus held stretched uniformly all round the last, it may be secured to the insole by nailing by hand or by any one of the automatic nailers in existence, or it may be cemented by smearing suitable cement upon the sole or the inside of the edge of the upper and then applying a clamp, substantially such as hereinbefore described, to press the upper and insole firmly upon one another. The clamp is so constructed that when applied to the upper upon the last while still in the machine it may be tightened up, and then both last and clamp removed together and laid aside until the cement is dry. If desired, the outer sole may be placed upon the inner one and the edge of the upper before the clamp is put on, and then the whole clamped and cemented together. The accommodate this outer sole, the thick part of the toe wiper-plate is made with a larger recess than the flexible one, so as to leave space for the end of the outer sole, which is generally somewhat longer than the last.

Having thus described my invention, what I desire to claim by Letters Patent is—

1. In a lasting-machine, a form-plate, as 34, provided with a recess conforming in shape to the heel or toe of the last and vertically flexible to conform to the curvature of the sole of the last.

2. In a lasting-machine, a form-plate, as 34, provided with a recess conforming in shape to the heel or toe of the last and constructed in sections which are hinged together, whereby it is vertically flexible to conform to the curvature of the sole of the last.

3. In a lasting-machine, a toe-lasting device provided with the herein-described recessed form-plate vertically flexible, in combination with means for adjusting the vertical curvature of said form-plate to the curvature of the sole of the last.

4. In a lasting-machine, a toe-lasting device mounted upon standards pivoted to the bed of the machine, said toe-lasting device provided with a vertically-flexible form-plate recessed to receive the toe of the last mounted upon said standards, in combination with means, substantially as described, for adjusting the vertical curvature of said form-plate to the curvature of the sole of a last.

5. In a lasting-machine, the combination of a toe-lasting device provided with a recessed form-plate fixed rigidly upon said toe-lasting device with a heel-lasting device provided with a recessed form-plate adjustable transversely of the machine upon said heel-lasting device and operated transversely by the heel of the last when the toe is forced into the recess of the rigid toe-form plate, substantially as described.

6. In a lasting-machine, a flexible wiper-plate provided with a support attached to each end thereof, in combination with means for adjusting said plate vertically and holding it positively in such adjusted position.

7. In a toe-lasting device of a shoe-lasting machine, the combination of a vertically-flexible form-plate, substantially such as described, with a vertically-flexible wiper-plate and means for adjusting said wiper-plate to conform to the curvature of said form-plate.

8. In a toe-lasting device of a shoe lasting machine, the combination of a vertically-flexible form-plate, substantially such as described, with a vertically-flexible wiper-plate and means for adjusting said form-plate and wiper-plate vertically simultaneously to conform to the varying curvature of the soles of different lasts.

9. In a lasting-machine, a clamp consisting of two plates or jaws provided with a curved recess in each jaw and suitably located upon the heel or toe lasting device of a shoe-lasting machine in position to receive within its recess the heel or toe of a shoe and grasp the upper by its edge when laid in an opposite direction from that it is to occupy when turned over the last.

10. In a lasting-machine, a yielding clamp, substantially as described, constructed of two plates, each of which is provided with a curved recess and one of which is provided with means to permit the clamp to yield to pressure applied to the upper to draw it from the clamp, and suitably located upon the heel or toe lasting devices in position to grasp the upper by its edge when laid in an opposite direction from that it is to occupy when turned over the last.

11. In a lasting-machine, a yielding clamp constructed of two plates, each of which is provided with a curved recess and one of which is provided with supplemental plates set into its interior surface to permit the clamp to yield to pressure applied to the upper to draw it from the clamp, and suitably located upon the heel or toe lasting devices in position to grasp the upper by its edge when laid in an opposite direction from that it is to occupy when turned over the last.

12. In a lasting-machine, a yielding clamp constructed of two plates, each of which is provided with a curved recess, and one of which is supplied with supplemental plates set into its interior surface in positions radial from the center of the recess to permit the clamp to yield to pressure applied to the upper to draw it from the clamp, and suitably located upon the heel or toe lasting devices in position to grasp the upper by its edge when laid in an opposite direction from that it is to occupy when turned over the last.

13. In a lasting-machine, a yielding clamp constructed of two plates, each of which is provided with a curved recess, and one of which is provided with supplemental plates set into its interior surface, which are provided with friction devices upon their faces to hold the upper and permit the clamp to yield to pressure applied to the upper to draw it from the clamp, and suitably located upon the heel or toe lasting devices in position to grasp the upper by its edge when laid in an opposite direction from that it is to occupy when turned over the last.

14. In a lasting-machine, a clamping device constructed of two plates, each of which is provided with a curved recess located at the toe of the apparatus to hold the upper by its edge, a stationary heel-post located at the heel and sufficiently distant to allow the upper to be inserted, and means for applying pressure upon the sole of the last near the toe, whereby the upper will be stretched around the toe of the last and be held between the heel of the last and the stationary heel-post, substantially as described.

15. In a lasting-machine, a yielding clamping device constructed of two plates, each of which is provided with a curved recess and means to permit the clamp to yield to pressure applied to the upper to draw it from the clamp, a stationary heel-post located at the heel and sufficiently distant to allow the upper to be inserted, and means for applying pressure upon the sole of the last near the toe, whereby the upper will be drawn from the yielding clamp and crimped at its edge, substantially as described.

16. In a toe-lasting device of a shoe-lasting machine, the combination, substantially as described, of a form-plate, wiper-plate, and a clamp-plate arranged together with the wiper-plate located between the form-plate and clamp-plate and all provided with coincident recesses, which conform in shape to the toe or heel of a shoe, substantially as described.

17. In a toe-lasting device of a shoe-lasting machine, a clamping device consisting of a segmental wiper-plate recessed as described and a similarly-recessed clamp-plate, said clamp-plate and wiper-plate forming the two jaws of the clamp, as and for the purpose specified.

18. In a toe-lasting device of a shoe-lasting machine, a clamping device consisting of a segmental wiper-plate recessed as described and similarly-recessed clamp-plate, said clamp-plate and wiper-plate forming the two jaws of the clamp, as and for the purpose specified, with a hold-down suitably located to apply pressure to the sole of the last.

19. In a toe-lasting device for a shoe-lasting machine, the combination of a form-plate, a wiper-plate, and a clamp-plate arranged together, the wiper-plate between the form-plate and clamp-plate, and all provided with coincident recesses which conform in shape to the toe or heel of a shoe, and a hold-down suitably located to apply pressure to the sole of the last.

20. In a toe-lasting device of a shoe-lasting machine, a yielding clamping device consisting of a segmental wiper-plate recessed as described and a similarly-recessed clamp-plate, said clamp-plate and wiper-plate forming the two jaws of the clamp, the clamp-plate provided with means to permit the clamp to yield to pressure applied to the upper to draw it from the clamp, and a hold-down suitably located to apply pressure to the sole of the last.

21. In a lasting-machine, a hold-down having a standard-rod and an arm working thereon, said standard being provided with a spiral groove in which works a stud set in the hold-down arm, and means for raising said arm automatically after it has been depressed, substantially as described.

22. In a toe-lasting device of a shoe-lasting machine, the combination of a recessed form-plate vertically flexible with two rods, one secured rigidly to one end of said plate and the other pivoted loosely to the other end, and each of said rods pivoted at its other end to a suitable part of the machine, substantially as described.

23. In a shoe-lasting machine, the combination of a non-extensible last-jack with a last disconnected therefrom, but adapted to rest upon said jack, said last provided with a pin or screw inserted in its top, as and for the purpose specified.

24. In a shank-lasting device of a shoe-lasting machine, the combination of one or more forks suitably mounted to engage the shank of the shoe, the levers 79 and 80, mounted upon pivots fixed upon a suitable part of the machine, and a pair of toggle-links, as 83 83, hinged to said levers at one end and pivoted together at the other, with means for operating said toggle-links.

25. In a shank-lasting device of a shoe-lasting machine, the combination of one or more forks mounted upon carriages in position to engage and operate upon the edge of the upper on either side of its shank, and the levers 83 83, fulcrumed to the standard 73 and pivoted at one end to said carriages and at the other end loosely connected to the toggle-links, which are connected at one end to the levers 83 83 and to one another at the other end and loosely connected to said lever at one end and to the toggle-links 85 85 at the other, substantially as described, as and for the purpose specified.

26. In a shoe-lasting machine, a clamp for holding an upper upon the last in a stretched condition, which consists of the combination of a flexible sole and an instep-strap encircling both last and sole, and a yoke located within the strap and between it and the sole, said yoke being provided with means for applying pressure to the sole of the last to cause it to conform to the curvature of the sole of the last.

27. In a shank-lasting device for a shoe-lasting machine, a fork mounted upon a carriage in a ball-and-socket joint in such position as to engage and operate upon the edge of the upper, substantially as described.

28. In a shoe-lasting machine, a segmental form-plate, substantially such as described, in combination with a tongue, as 38, secured to one segment of said plate overlapping the space between that segment and the adjacent one and resting upon said adjacent segment.

JOHN Q. A. HOUGHTON.

Witnesses:
ARTHUR STEUART,
MAGGIE TURNER.